United States Patent Office 3,192,627
Patented July 6, 1965

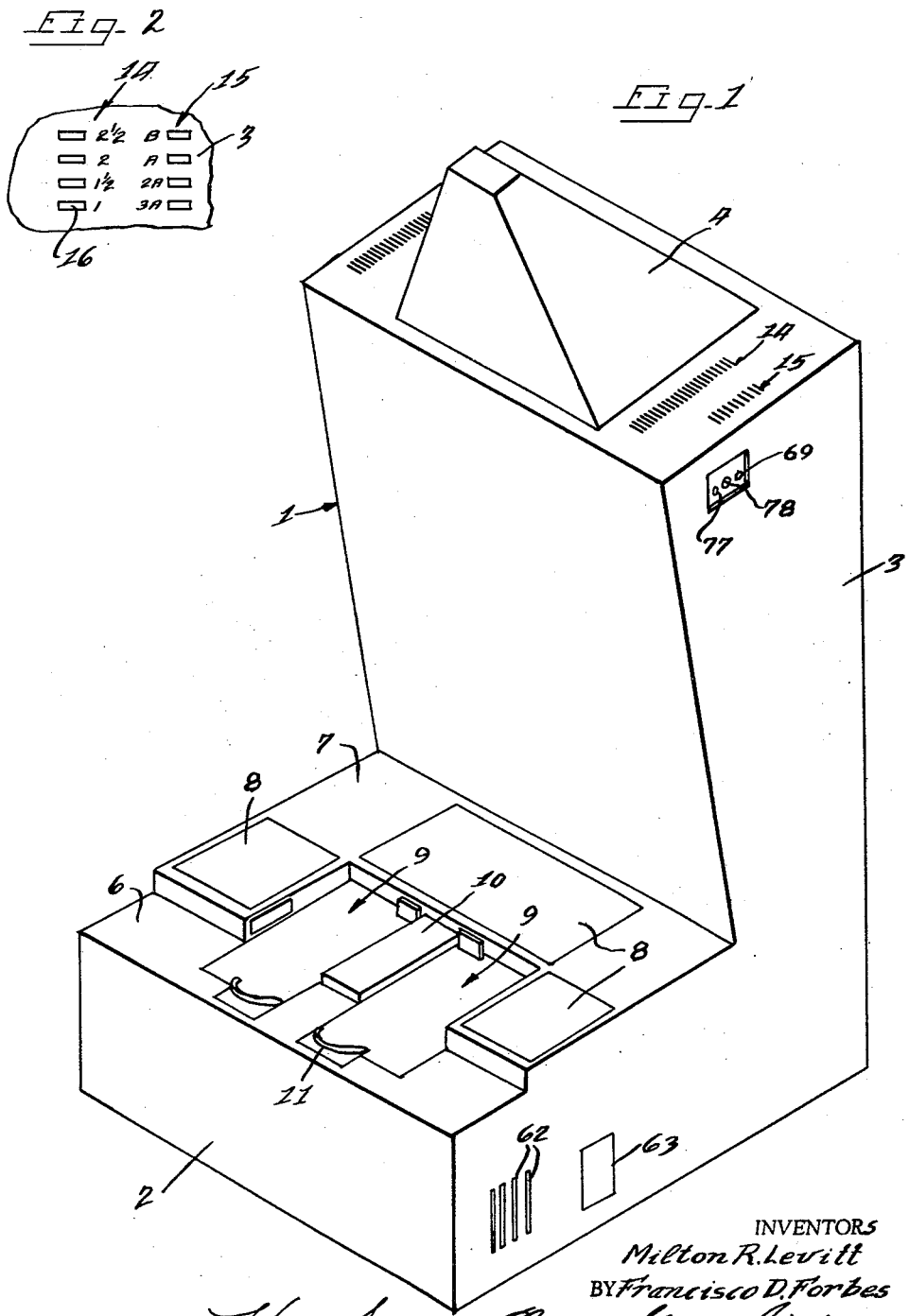

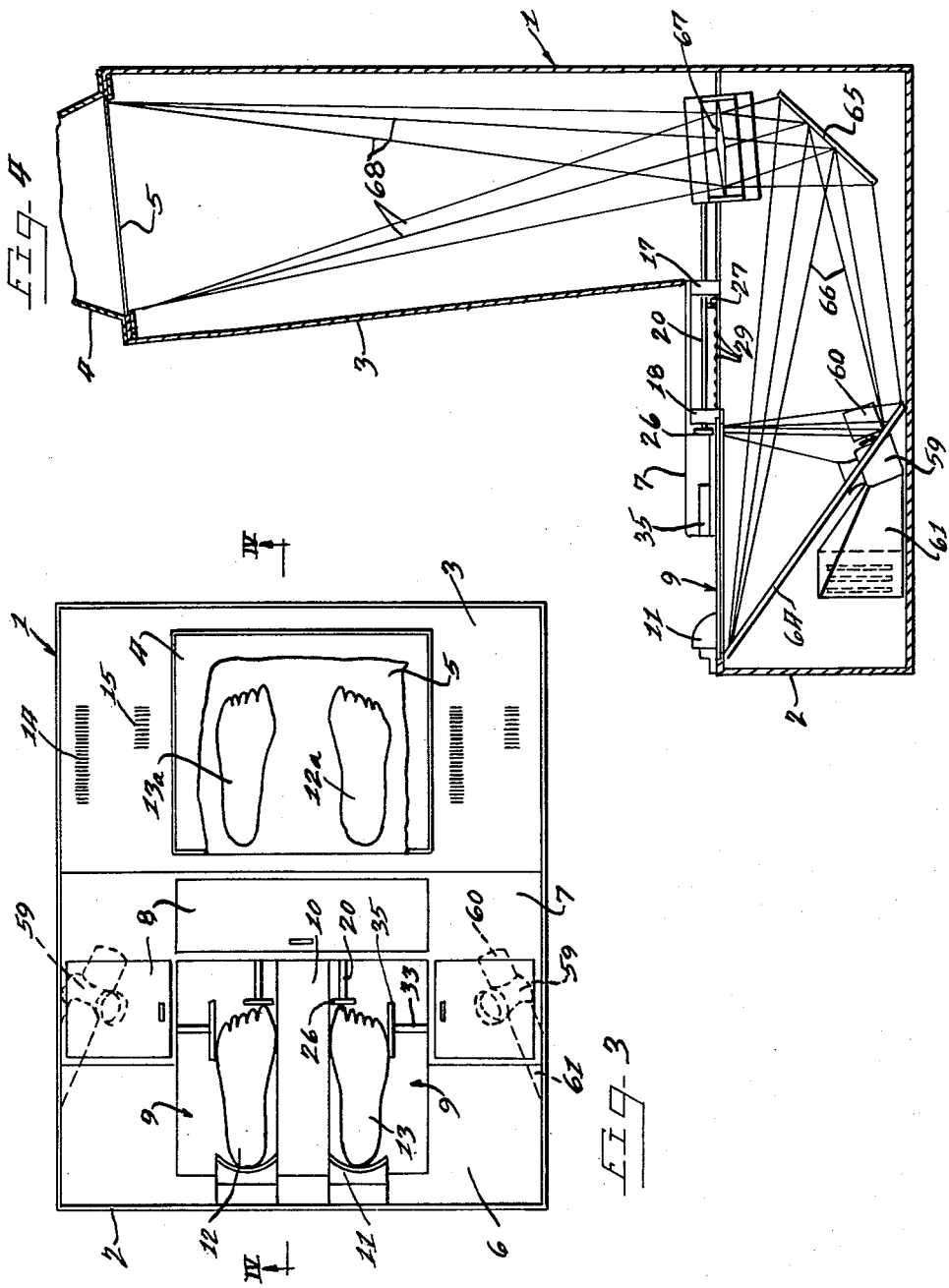

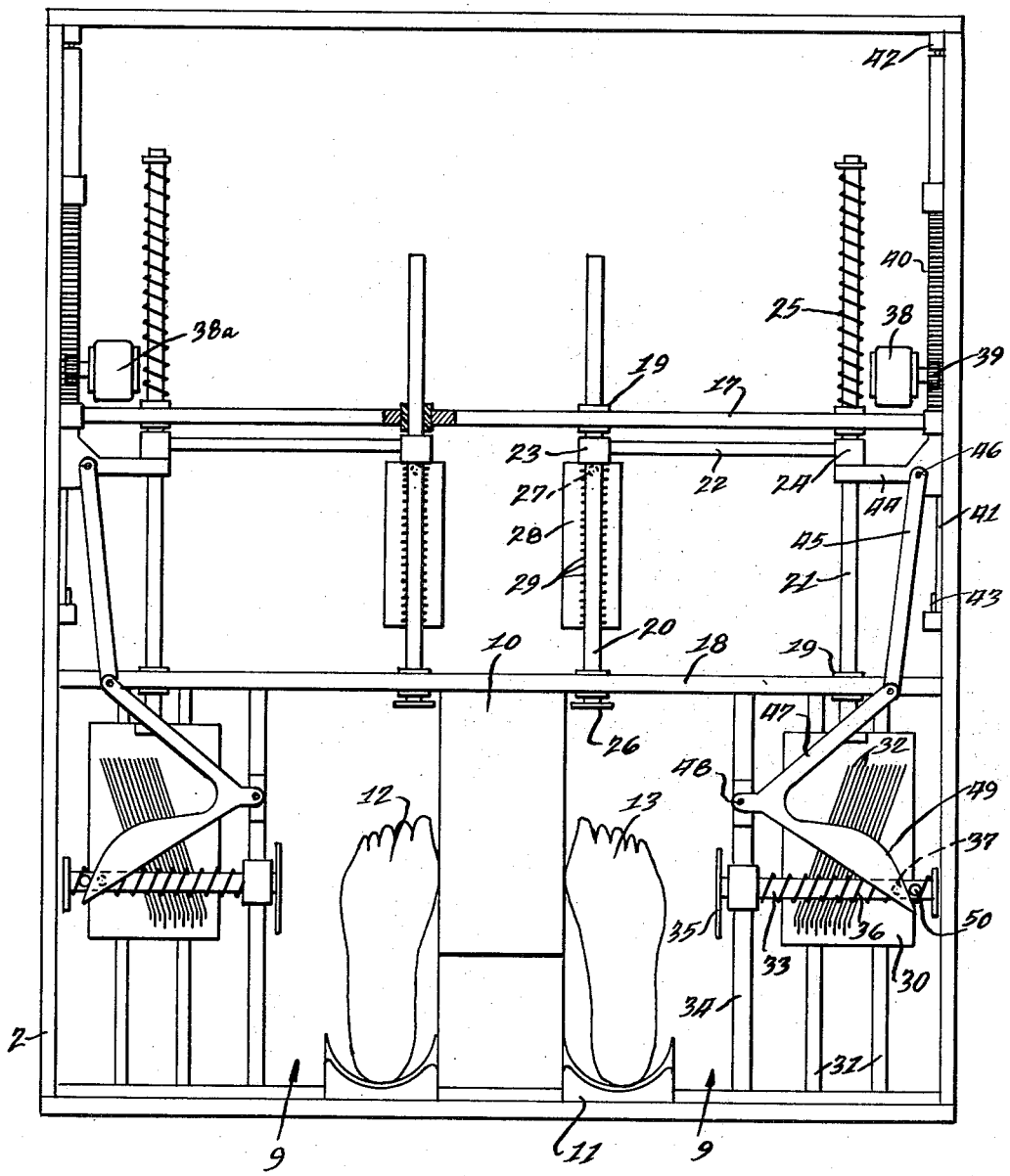

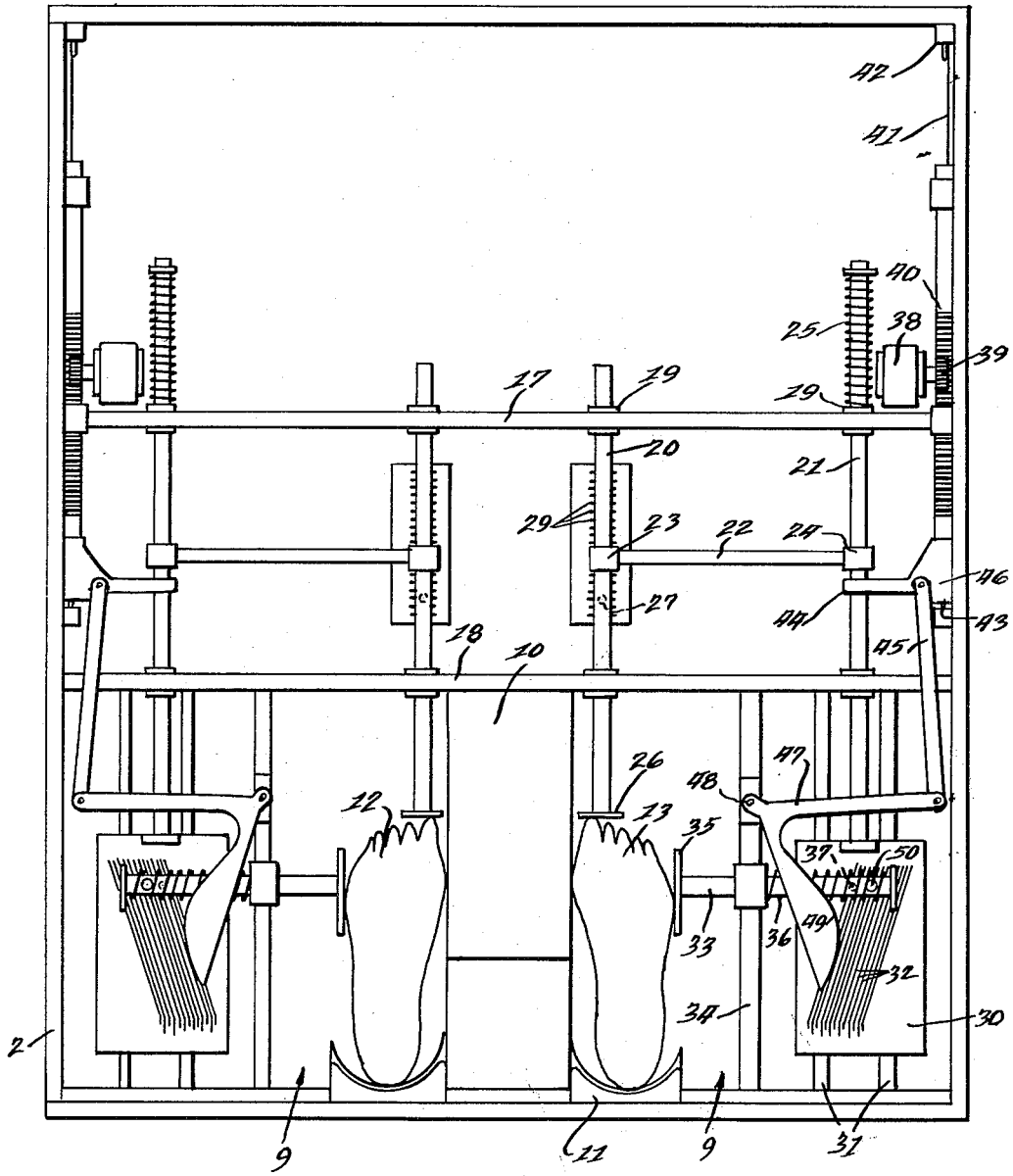

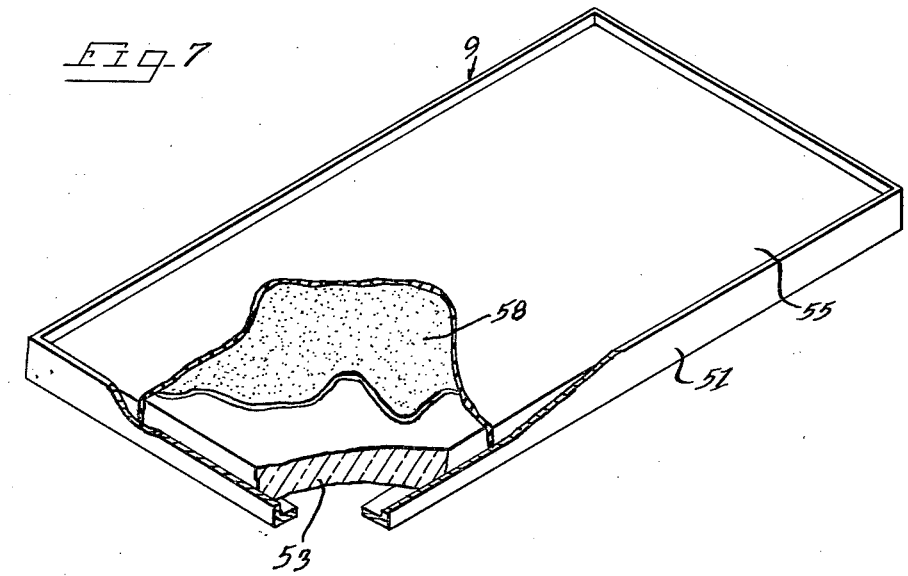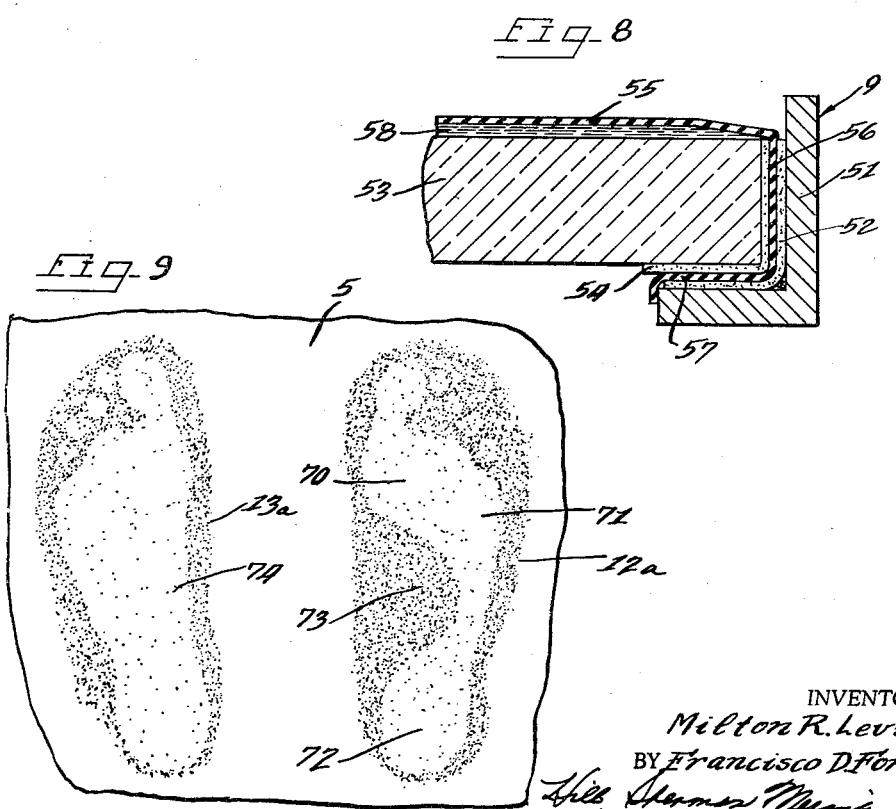

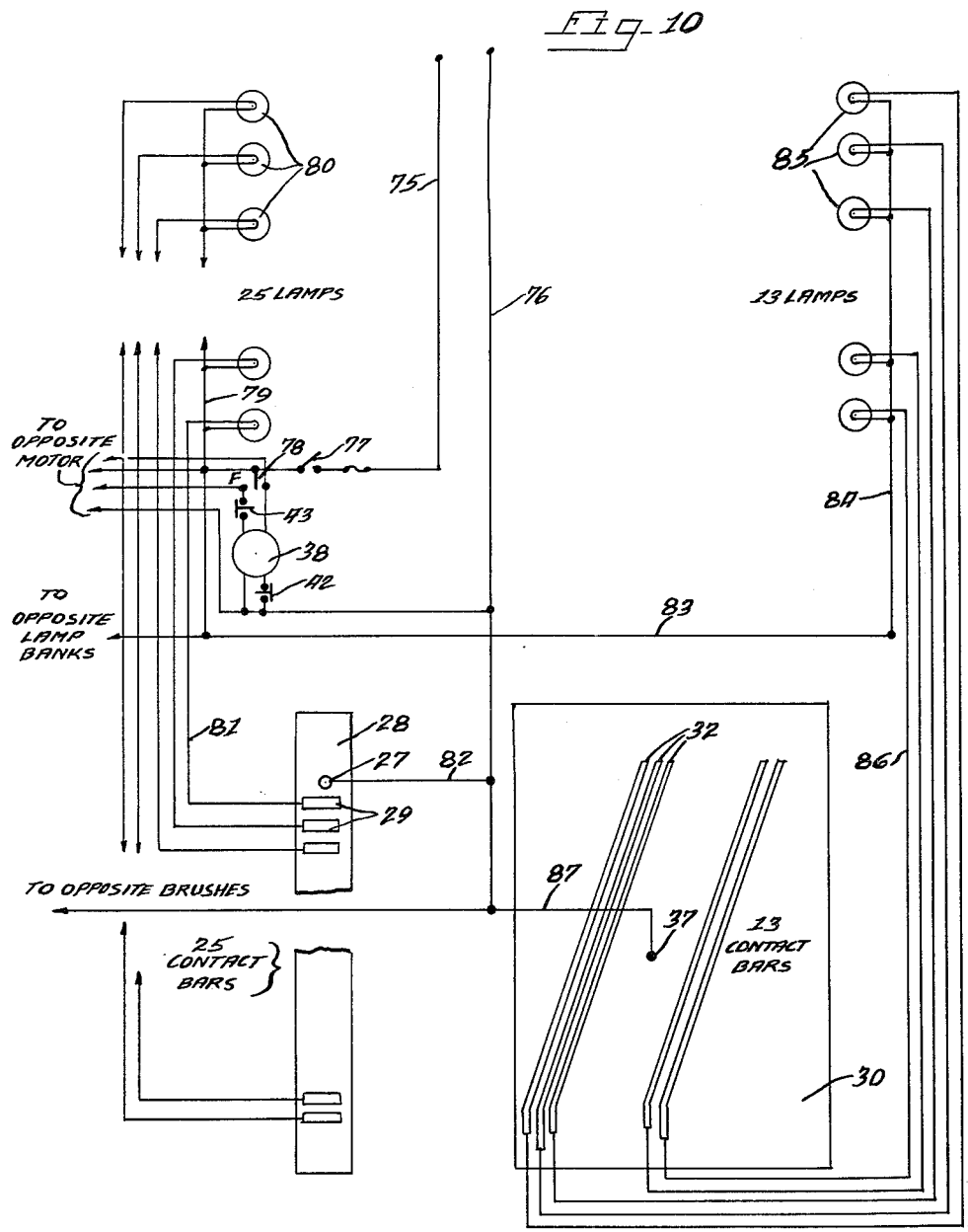

3,192,627
FOOT MEASURING AND PEDOGRAPH
REVEALING MACHINE
Milton R. Levitt and Francisco D. Forbes, New Brunswick, N.J., assignors to The Scholl Mfg. Co., Inc., Chicago, Ill., a corporation of New York
Filed Jan. 3, 1962, Ser. No. 164,124
6 Claims. (Cl. 33—3)

This invention relates to improvements in a foot measuring and pedograph revealing machine, and more particularly to a machine highly desirable for use in shoe stores, shoe departments, and other locations where footwear is sold for the purpose of determining the proper size shoe or other article of footwear for a particular customer and at the same time revealing the general condition of the feet of the customer to both the customer and the attendant, although the invention may have other uses and purposes as will be apparent to one skilled in the art.

In the past, many and various types of foot measuring devices have been developed, but such devices were objectionable in that in most instances the device was manipulated by the shoe salesman or other attendant, and did not function automatically. This resulted frequently in an inaccurate fit for a particular customer, because of the human element involved, since some salesmen had a tendency to adopt a lesser size where it was difficult to determine which of two sizes was the proper one, while other salesmen had a tendency to adopt the larger size.

Heretofore, also, in many instances machines for taking permanent pedographs of the feet were utilized, but such added materially to the cost of making a sale to individual customer, and the customer was well aware of that added cost.

In order to denote to the customer himself whether or not a shoe fitted his foot properly, X-ray machines were frequently used in the past. When standing on the tread plate of one of those machines, the customer had the footwear on his feet, and the machine revealed the bone structure of the foot and more vaguely the outline of the shoe around that bone structure. The machine itself did not indicate the proper size of shoe for the particular customer prior to the customer trying on the shoes and while it might reveal a pronounced deformity in the bone structure of a foot, it did not reveal other important afflictions or malformations which occur mainly in the fleshy parts of a foot. However, in the major number of localities, such X-ray machines have been condemned and their use forbidden because of the fact X-rays passed through portions of the customer's body.

With the foregoing in mind, it is an important object of the instant invention to provide a machine upon which a customer may stand in his stocking feet, and the machine will automatically and visually denote the proper length and width sizes of shoes for the particular customer and at the same time visually reveal the general condition of the plantar surfaces of the customer's feet denoting whether or not a permanent pedograph should be taken and also denoting whether a special type of shoe or additional corrective means in a standard shoe are indicated.

Another object of this invention resides in the provision of a machine which automatically measures a foot and visually indicates the correct size shoe for that foot, both as to length and width.

It is also an object of this invention to provide a machine which provides visual pedographic images of the human feet or portions thereof while the feet are at rest or in motion.

Also a desideratum of the instant invention is the provision of a machine having tread means upon which a person may stand either barefooted or stocking-footed, and which machine automatically measures the feet, and visually indicates the correct size of shoes for the feet adjacent viewing means on which pedographic images of the feet appear.

A further object of this invention is the provision of a machine capable of providing visual pedographic images of the human feet on a viewing screen by means of light reflection, there being no rays, Roentgen or otherwise, passing through any part of the subject's body.

It is also a feature of the instant invention to provide a machine having a platform over which entrapped colored liquid is disposed, and upon which a person may stand thereby displacing the liquid by the weight of the person, the machine having light reflecting means to transfer pedographic images of the feet of the subject to a viewing screen where the normal or abnormal character of the feet can be readily observed.

It is still a further feature of the instant invention to provide a machine having means which are electrically released from inoperative position and electrically restored to inoperative position for automatically measuring a human foot, the means responding to a resilient pressure so adjusted that the foot contacting part of the means will automatically stop when the foot is contacted and not exert any but negligible pressure thereagainst, the machine also having electrical circuits whereby one of a bank of lamps is illuminated to denote the proper size of shoe for the foot being measured.

Another object of the invention resides in the provision of a machine that is economical, both as to construction and operation, pleasing in appearances, and which automatically measures a foot, visually indicates the proper size shoe for that foot, and reveals a pedographic image of the foot in an extremely short period of time, whereby a customer is readily assured that he is being properly fitted with a new pair of footwear, at no additional expense, and at the same time that the footwear will be adjusted or augmented by additional corrective means for a foot condition indicated by the pedograph image.

While some of the more salient features, characteristics adadvantages of the instant invention have been above pointed out, others will become apparent from the following disclosures, taken in conjunction with the accompanying drawings, in which:

FIGURE 1 is a perspective view of a machine embodying principles of the instant invention;

FIGURE 2 is an enlarged fragmentary plan view of the size indicating scales diagrammatically shown at the top of FIGURE 1;

FIGURE 3 is a top plan view of the machine, with a portion of the hood broken away, and with feet in pedographic images diagrammatically indicated;

FIGURE 4 is a fragmentary vertical sectional view through the machine taken substantially as indicated by the line IV—IV of FIGURE 3, looking in the direction of the arrows;

FIGURE 5 is an enlarged plan view of the lower portion of the machine, with parts omitted, illustrating the size measuring mechanism in inoperative position;

FIGURE 6 is a view similar to FIGURE 5, but illustrating the size measuring mechanism in operative position;

FIGURE 7 is a perspective view of a tread plate, with parts broken away to reveal portions therebeneath;

FIGURE 8 is a greatly enlarged fragmentary sectional view through the marginal portion of the tread plate of FIGURE 7 to indicate its general construction;

FIGURE 9 is a fragmentary top plan view of the viewing plate indicating somewhat diagrammatically the pedographic images appearing thereon when the machine is in operation; and FIGURE 10 is a fragmentary wiring diagram of the circuit associated with the measuring mechanism to indicate shoe sizes.

As shown on the drawings:

Obviously, many components of the instant invention may be widely varied as to size and structural details without departing from the spirit and scope of the invention. Therefore, the invention is illustrated somewhat diagrammatically, and no attempt has been made to illustrate specific connecting means between the casing and the inside frame structure, since anyone skilled in the art can readily provide the essential frame members, fixed supports, and the like.

*The machine in general*

With reference more particularly to FIGURES 1, 2 and 3, it will be seen that the machine in general comprises a casing or housing generally indicated by numeral 1 and which encloses the mechanism of the machine except for the parts essentially disposed for ready access to or vision of the customer, patient, or other subject person.

The casing 1 includes a low forwardly extending portion 2, preferably of a suitable height for a person to step up upon it, and a higher rear portion 3 of a convenient height for a person standing on the platform portion 2 to look through a hood 4 and observe a viewing screen 5 which may satisfactorily be a ground glass screen. The height of the elevated casing portion 3 would, of course, be increased somewhat if the hood 4 were omitted and the viewing screen recessed in the upper casing portion to protect the screen from outside light.

The low forward portion 2 of the casing has a double level platform top including a lower level 6 and an upper level 7 which is just sufficiently higher than the level 6 to house a portion of the foot measuring mechanism. A plurality of doors 8 may be provided wherever deemed necessary or convenient to provide access to the interior mechanism through the upper lever 7.

The lower platform level 6 has mounted thereon a pair of adjacent tread plates, generally indicated by numeral 9, one for each foot of the subject person and both being of identical construction. These tread plates 9—9 are separated by a fixed guide member 10 which aids in positioning the foot properly upon the respective tread plate, the portion of a foot adjacent the first metatarsal head contacting the guide member 10 at a side edge thereof, as diagrammatically seen in FIGURES 2, 5 and 6. To the rear of each tread plate 9 and offset toward the inner side of the tread plate is an upstanding heel cup or guide 11 against which the heel of the subject person is positioned.

In the use of the machine, the subject person stands upon the tread plates 9—9 with each foot positioned against the respective side of the guide member 10 and the heel guide 11, as indicated diagrammatically at 12 and 13 in FIGURE 3. When the machine is energized, mechanism automatically measures the size of the foot, both as to length and width, and on a suitable length scale 14 and an associated scale 15 for each foot mounted in the top of the elevated portion 3 of the casing the correct size of a shoe to fit the respective foot is indicated. As seen in FIGURE 2, such size scales may comprise a series of glass covered openings in the top of the casing with adjacent series of numbers and letters indicating length and width. By means to be later described, a window denoting the proper length size and a window denoting the proper width size for each foot will be illuminated so that the subject person may readily see the correct size shoe he is to wear. Contemporaneously with the size measurement and indication, other means to be later described will transfer a pedograph image of each foot from the underside of the respective tread plate 9 to the viewing screen 5 in the top of the elevated casing portion 3, as indicated at 12a and 13a in FIGURE 3. In the most economical form of structure, where only one lens is utilized in the image transmitting means, the images will be in reverse order, that is the image 13a of the right foot 13 will appear on the left-hand side of the viewing screen, while the image 12a of the left foot 12 will appear on the right-hand side of the screen. If a more expensive structure is desired two lenses may be employed in the image transmitting means to establish foot and image alignment, but such is not necessary. Such pedograph images will at once reveal both to the subject person and the attendant any abnormalities or defects in the foot discernible from the plantar surface thereof and if the subject person is a prospective customer, that customer is as well aware as the attendant that some additional corrective means must be utilized in order to aid or properly fit his feet.

*The foot measuring mechanism*

The mechanism for measuring the length and with sizes of a foot on a tread plate 9 is best seen in FIGURES 5 and 6 of the drawings. Since the mechanism for measuring the left foot is merely an allochiral arrangement of identical mechanism with that for measuring the right foot, only one of these mechanisms need be specifically described herein.

When a measurement is taken, the subject person is standing upon the tread plates 9—9 with his full weight upon his feet.

In FIGURE 5 the size measuring mechanism is shown in inoperative position. A pair of fixed transverse frame members 17 and 18 carry suitable slide bearings as indicated at 19 wherever needed, which bearings are preferably of material providing a minimum amount of friction and which needs no lubrication, such, for example, as polytetrafluoroethylene bearings. Slidable in such bearings are spaced rods 20 and 21 rigidly connected together for simultaneous movement by a crossarm 22 attached to the respective rods by collars 23 and 24. Movement of the rods 20 and 21 in unison forwardly toward the feet of the subject person is caused solely by contraction of a tension spring 25 around the portion of the rod 21 to the rear of the frame member 17 and fixed at one end to a bearing 19 or the frame member itself and connected at the other end to the rear end of the rod 21.

On the forward end of the rod 20 is a head 26 for contacting the tip of the large toe of the foot 13 being measured. This rod 20 carries a brush 27 thereon extending below the rod, which brush may be slidable or a roller brush as deemed most expedient. As the rod moves forward this brush passes over a fixed plate 28 having a series of contact bars 29 thereon similar to a flat commutator, there being one such contact bar for each size and half size appearing in the aforesaid length scale 14 disposed on top of the casing 1. As will later appear, the brush and the respective contact bar corresponding to the size of the particular foot close a circuit connection to illuminate one of a bank of lamps associated with the size scale 14.

Attached to the forward end of the rod 21 is a non-conductive plate 30 which is ridable over fixed track members 31. This plate 30 carries a series of spaced contact bars or strips 32 thereon, and such structure is also in effect a flat commutator. It will be noted that the contact bars 32 are disposed obliquely on the plate 30. This is because an A width for a size 7 shoe is considerably less in physical measurement than an A width for a size 10 shoe, and consequently the contact bars 32 are obliquely disposed at an angle in keeping with width variations as adopted in the United States by the National Association of Retailers for standard shoe lasts.

Disposed above the plate 30 is a transverse slide rod 33 slidable through a suitable bearing on a longitudinal frame member 34, and which carries on its inner end a head 35 for contacting the foot 13 adjacent the outer metatarsal head of the foot. This rod 33 is moved inwardly toward the foot solely by contraction of a tension spring 36 disposed around the rod and connected at one end to the bearing or frame member 34 and at the other end to the outer end of the rod. This rod 33 carries a brush 37 extending therebeneath to establish electrical contact with the contact bars 32.

Electrically actuated means are utilized to control movement of the rods 20, 21, and 33. These means include a reversible electric motor 38 having a pinion 39 on its shaft which actuates a rack 40 ridable on a track 41 secured to the casing. When this rack reaches the position seen in FIGURE 5, the rear end of the rack contacts a normally closed microswitch or limit switch and breaks the circuit which actuates the motor in that direction. When the motor is energized to operate in the opposite direction, the forward end of the rack will contact and open a normally closed microswitch 43, as seen in FIGURE 6. Extending laterally from the forward end of the rack is an arm 44 which reaches into a position so as to engage the collar 24 on the rod 21 when the rack moves toward the rear of the casing, as seen in FIGURE 5. A toggle linkage is also connected to the rack and includes a lever 45 with one end pivoted to the rack as indicated at 46, and the other end of the lever is pivoted to one arm of a bellcrank lever 47 having its apical portion pivoted as indicated at 48 to the fixed frame member 34. The other arm of the bellcrank 47 is provided with a cam surface 49 thereon operable against an upstanding pin 50 on the measuring rod 33. Accordingly when the motor is actuated in a direction to move the rack rearwardly, the rods 20 and 21 are moved rearwardly by the engagement of the arm 44 with the collar 24 against the spring 25, thus tensioning that spring. At the same time the cam surface 49 on the bellcrank engages the pin 50 and forces the rod 33 outwardly against spring 36, thus tensioning that spring. It will be seen, therefore, that when the mechanism is moved to inoperative position it is forced to inoperative position by the motor 38 and tension is placed upon both the springs 25 and 36.

Now when the motor is operated in the opposite direction, to move the rack forwardly, and effect a measurement of the foot 13, the arm 44 on the rack merely moves away from the collar 24, and the cam surface 49 of the bellcrank lever merely moves away from the pin 50 on the rod 33. This permits the rods 20 and 21 to be moved forwardly solely by contraction of the spring 25 and the rod 33 removed inwardly solely by the contraction of the spring 36, to the position seen in FIGURE 6, and the stopping position depends upon the size of the foot being measured. Springs 25 and 36 are so calibrated as to each move its respective mechanism until slight resistance is offered by contact of the measuring heads 26 and 35 with the foot 13. When these heads contact the foot and are slightly resisted thereby, the action of the respective springs is stopped, and the springs are so calibrated as to strength that contact of the heads 26 and 35 with the foot, without any undue pressure being exerted on the foot so as to adversely effect the size measurement is sufficient to stop the spring action.

When the plate 30 is stopped in motion, and the rod 33 is stopped in motion by contact of the head 35 with the foot 13, the brush 37 carried by the rod 33 will rest upon one of the contact bars 32 and close a circuit causing the illumination of one lamp in a bank of lamps associated with the width size scale 15 at the top of the casing and thus plainly indicate the proper width of shoe for the particular foot.

Mechanism of identically the same construction as that just above described is disposed on the left-hand side of the cabinet to effect proper measurement of the left foot 12 and show indications on the proper size scales 14 and 15 for the left foot disposed on top of the cabinet as seen in FIGURE 3. This left hand mechanism is actuated by a like reversible motor 38a connected in parallel with the motor 38 for simultaneous operation therewith.

*The tread plate construction*

While one single tread plate could be utilized for both feet of the subject person, it is preferable to have an individual tread plate for each foot, particularly for purposes of repairs if any are needed, original installation, and the fact that a somewhat lesser thickness of glass may be utilized.

With reference now to FIGURES 7 and 8, it will be seen that each of the tread plates 9, which are identical in construction, comprises an outer frame 51 of angular shape immediately inside of which is a layer 52 of sealing compound of suitable character, preferably a somewhat resilient cementitious substance. A relatively heavy plate 53 of glass or transparent plastic material, of sufficient thickness to withstand the weight of the subject person is provided around its edge and under margin with the layer 54 of sealing compound. Extending over the top of the transparent plate 53 is a flexible rubber or thermoplastic diaphragm 55 which extends over the edge of the plate as indicated at 56 and a marginal portion thereof is turned under the plate as indicated at 57 between the two layers 52 and 54 of sealing compound which firmly hold the diaphragm in position. As seen best in FIGURE 8 the diaphragm 55 is spaced slightly above the top surface of the plate to provide room for a quantity of colored liquid 58, which may satisfactorily be water with a water soluble die therein preferably of a dark color such as a deep blue.

Consequently, when a subject person steps upon a tread plate 9 and particularly upon the diaphragm 55 thereof, the liquid will be displaced under pressure points of the foot. Under the main weight supporting bearing points of the foot the liquid will be practically pushed entirely aside from between the diaphragm and the plate, and to a lesser extent at lighter pressure points, leaving the general foot pattern surrounded by a dark area of the liquid.

*The pedograph image transfer means*

With reference now to FIGURES 3 and 4 of the drawings, it will be seen that a high power lamp 59 is disposed within the casing and focused upon each of the tread plates 9—9. Each of these lamps is provided with a cooling fan as indicated at 60 and a duct 61 leads from the respective lamp to a series of ports 62 in the side of the casing as best seen in FIGURE 1. A door 63 may be provided to afford access to the respective lamp from outside the casing.

The lamps 59—59 effectively illuminate the glass plates 53—53 of the tread plates 9—9 through the bottoms thereof.

Disposed between the lamps 59—59 is an angular mirror 64 and at the rear of the casing is another angular mirror 65 which receives reflections from the mirror 64 as indicated by the lines 66. Light rays from the mirror 65 pass through a fixed lens 67 and are received by the viewing plate 5 as indicated by the lines of reflection 68. Thus, pedograph images of the feet 12 and 13 are transferred from the glass plates 53—53 to the viewing plate 5, but if only one lens is utilized, as illustrated, the pedograph image of the right foot will be on the left side of the view plate, and the image of the left foot will be on the right hand side of the plate, as best seen in FIGURE 9 where such images are diagrammatically illustrated.

The lamps 59—59 are connected in parallel, in a known manner, for simultaneous energization and may be controlled by a single switch on the side of the cabinet as indicated at 69 in FIGURE 1.

With reference to FIGURE 9 it will be noted that the images 12a and 13a of the feet 12 and 13 denote substantially all characteristics of the feet that may be determined from the plantar surface of a foot or from any form of pedograph print. However, in the instance of this invention, the images give what might be termed live pedograph prints, because the foot may be moved as directed, and if it is desired for the subject person to rock upon the heels, or raise upon the toes, such movement will be instantly produced in the images.

By way of example we have illustrated the image of a substantially normal left foot at 12a, but what might be termed a flat right foot at 13a, the longitudinal arch of the right foot having fallen. It will be noted that the three normal bearing points of a foot, as indicated at 70, 71 and 72 will appear substantially white or extremely bright in the image, while the contact on the diaphragm with the fleshy parts of the foot will have a darker shade of color, and the image of the foot itself will be surrounded by a still darker color. For example, in the case of the image 12a of the left foot, there is a dark area 73 beneath the longitudinal arch indicating that that arch is in good condition, whereas in the image 13a of the right foot, there is a light area 74 underneath the longitudinal arch indicating that that arch has fallen. Accordingly, the attendant should recommend the use of suitable arch supporting means for the right foot, to be incorporated in the shoes being fitted.

The pedograph images not only indicate a case of flat-foot, but are equally advantageous in indicating various other afflictions or abnormalities of the foot including weak foot, weaker fallen conditions of the metatarsal arch, hollow foot, hump-foot, callosities, corns on the plantar surface of the foot, hammer toe conditions, bunions and hallux valgus, overlapping toes, and various other such conditions, as well as conditions tending to result in particular afflictions not yet fully developed, but indicating some additional treatment should be had at the present time.

*The electrical circuit for the foot measuring mechanism*

In FIGURE 10 we have illustrated diagrammatically a satisfactory wiring diagram for the foot measuring mechanism. The mechanism for the left foot is connected in parallel with that for the right foot, so only half of the ttoal wiring diagram is suggested in FIGURE 10.

Current may be taken from any suitable convenient outlet through conductors 75 and 76. In conductor 75 there is shown an on-off switch 77 which controls the power admission to the entire mechanism. Also preferably in this line is a reversing switch 78 which is utlized to govern the direction of operation of the reversible motors 38 and 38a. The line 75 is connected to a conductor 79 to which one side of each of a bank of lamps 80 is connected. The other side of each lamp is connected through a conductor 81 to one of the contact bars 29 on the fixed plate 28, each lamp being connected to a different contact bar than any other lamp. The brush 27 which rides over the contact bars 29 is connected to the other line conductor 76 as indicated at 82. Consequently when the brush 27 is at rest upon one of the contact bars 29, the circuit is closed through the respective lamp.

The common lamp bank conductor 79 is connected by way of a conductor 83 to a common conductor 84 for the second lamp bank including lamps 85, one side of each of which is connected to the conductor 84. The other side of each lamp is connected by another conductor indicated at 86 to one of the contact bars 32 on the plate 30, each lamp being connected to a different contact bar. The brush 37 which rides over the contact bars 32 is connected by a conductor 87 to the opposite line conductor 76. Therefore, when the brush 37 rests upon one of the contact bars 32 a circuit is established which will energize the particular lamp 85 connected to that contact bar.

Any desired number of lamps 80 may be used in the length size indicating bank, and any desired number of lamps 85 may be used in the width size indicating bank. For illustrative purposes we have selected twenty-five lamps for association with the length size scale 14 which are sufficient to give a full range of shoe sizes from one to thirteen with the corresponding twelve half-sizes; and we have selected thirteen lamps 85 associated with the width size scale 15 to indicate a range of widths from quintuple A to quintuple E.

When the motors 38 and 38a are actuated in the forward direction for foot measuring purposes by the switch 78, they are automatically stopped by the limit switches 43—43 in the manner explained above, and reversely when actuated in the opposite direction they are automatically stopped by the limit switches 42—42.

*Operation*

The operation of the instant invention is believed to be sufficiently apparent from the foregoing description as to warrant little additional explanation. The subject person after removing his footwear stands upon the tread plates 9—9. The feet may be measured and pedograph images thereof provided simultaneously or separately as may be desired by the manipulation of the corresponding switches. However, it should be noted that both measurements and pedograph images are necessary whether taken simultaneously or separately, for the proper fitting of a shoe to an individual foot, since an image may indicate the desirability of a permanent pedograph of a particular foot being taken, or the desirabiilty of utilizing an additional corrective appliance in the shoe for that particular foot. It will also be noted that characteristics of an individual foot can be readily established by virtue of the fact that a pedograph image will move in accordance with movements of the foot while on one of the tread plates 9.

Upon closing of the line switch 77 and the energization of the reversing switch 78 to operate the motors in the forward direction, both feet are simultaneously measured as to length and width and in the length scale 14 and the width scale 15 for each foot, a light from the bank 80 and one from the bank 85 will be illuminated thereby denoting the proper size shoe for that particular foot. The respective sizes for both feet and the pedograph images of both feet may be simultaneously revealed both to a prospective customer or patient and to the attendant.

It will be understood that modifications and variations may be effected without departing from the scope of the novel concepts of the present invention.

We claim as our invention:
1. In a foot measuring and pedograph image revealing machine,
 (a) a casing having a
  (a1) platform portion and an
  (a2) upstanding portion,
 (b) transparent tread means to support the feet of a user on said platform portion,
 (c) means entrapping dark liquid on the top of said tread means,
 (d) a viewing screen in the upper part of said upstanding casing portion,
 (e) illuminating means for the underside of said tread means,
 (f) reflecting means to transfer pedograph images of the feet from the underside of the tread means to said viewing screen,
 (g) a pair of foot contacting members for each foot of the user, one to contact the tip of the great toe, and the other to contact the side of the foot,
 (h) tension spring means urging each of said contacting members toward a foot on said tread means and calibrated to stop upon slight pressure against a foot,
 (i) power controlled means to retract said contacting members and place the spring means under tension,
 (j) electrical contact means carried by said contacting members,

(k) a series of contact bars in the path of the contact means on each of said members, (l) circuit means embodying said electrical contact means and said bars, (m) a series of lamps in said circuit means for each contact means, (n) and length and width size scales adjacent said series of lamps, whereby separate lamps will be illuminated to indicate the length and width of a foot on said size scales while the pedograph image of the same foot appears on said viewing screen.

2. A foot measuring and pedograph image revealing machine in accordance with claim 1, wherein the electrical contact means includes a series of parallel contact bars and a contact connected with the foot contacting member contacting the great toe, and engaging one of said contact bars to energize a foot length indicating lamp, a series of obliquely arranged contact members connected with the contacting member contacting the toe to the foot and bodily moving with said foot contacting member engaging the great toe, and a contact member movable with said contacting member contacting the side of the foot and engaging an obliquely arranged contact member to energize a foot width indicating lamp, indicating the width size of the shoe in accordance with the length of the foot.

3. A foot measuring and pedograph image revealing machine in accordance with claim 1, wherein the foot contacting members for each foot are guided for rectilinear movement towards each other and at right angles with respect to each other to be engaged with the foot by the tension spring means, wherein the power controlled means retracting the contacting members independently retract the contacting members for each foot and include individual electrically energizable motors for each pair of foot contacting members, and wherein drive connections are provided from said motors to retract said foot contacting members and comprise rectilinearly movable arms retracting said foot contact members contacting the tip of the great toe and angularly movable cams connected with said arms and operated thereby and retracting said contact members contacting the side of the foot.

4. A foot measuring and pedograph image revealing machine in accordance with claim 3 wherein the means driven by the individual motors for retractably moving the arms comprise pinions and racks rectilinearly moved thereby and connected with said arms, wherein individual linkage and leverage connections are provided between said arms and said angularly movable cams, and wherein limit switches are provided to limit movement of said racks in each direction of travel thereof.

5. In a foot measuring machine, (a) means to support and position a foot to be measured, (b) rectilinearly guided foot length and foot width contacting members guided for movement at right angles with respect to each other toward and away from each other, (c) individual springs for said foot length and foot width contacting members moving said foot contacting members toward the foot and calibrated to stop movement of said members upon engaging the foot, (d) power means to retract said contacting members against said springs, (e) a rectilinearly guided member, (f) an engaging connection between said rectilinearly guided member and said foot length contacting member withdrawing said foot length contact member from the foot and accommodating said spring means to move said foot length contact member toward the toe of the foot, (g) means driven by said power means for rectilinearly moving said rectilinearly guided member, (h) an angularly movable cam for moving said foot width contacting member to withdraw said foot width contacting member from the foot, (i) a linkage connection between said rectilinearly guided member and said angularly movable cam to effect withdrawal of said foot width contacting member upon withdrawal of said foot length contacting member, (j) a series of length indicating lamps individually energizable to indicate increments in length of the foot, (k) a series of width indicating lamps individually energizable to indicate increments in width of the foot, (l) a fixed non-conducting plate having a series of contact bars, each connected to energize a different lamp in the length size scale, (m) a brush connection with said foot length contacting member and movable over said bars in accordance with the length of the foot to effect the energization of a foot length indicating lamp, (n) a movable plate guided for movement in the direction of movement of said length measuring contacting member and having a series of obliquely disposed contact bars, each connected to energize a different lamp in the foot width size scale, (o) a brush connected with said width contacting member and movable over the obliquely disposed contact bars on said movable plate to effect the energization of a width indicating lamp, and (p) an operative connection between said rectilinearly guided member and said movable plate for moving said plate in accordance with movement of said foot length contacting member, to effect the energization of the correct width indicating lamp in accordance with varying lengths of feet.

6. In a foot measuring and pedograph image revealing machine, (a) a casing having a
  (a1) platform portion and an
  (a2) upstanding portion having a viewing screen thereon, (b) transparent tread means on said platform portion adapted to support at least one foot of a user on said platform portion, (c) means entrapping dark liquid on the top of said tread means, (d) illuminating means for the underside of said tread means, (e) reflecting means to transfer pedograph images of the feet from the underside of the tread means to said viewing screen, (f) a pair of rods guided for free rectilinear movement toward and from each other and disposed at right angles with respect to each other, (g) a foot contacting member on one rod adapted to contact the tip of the great toe, (h) a foot contacting member on the other rod adapted to contact the side of the foot, (i) individual springs connected with said rods urging said contacting members toward a foot on said tread means and calibrated to stop upon slight pressure against the foot, (j) a foot length size scale including a series of lamps adjacent said viewing screen for indicating increments in length of the foot, (k) a foot width size scale including a series of lamps adjacent said viewing screen indicating increments in width of the foot, (l) an electrically energizable motor, (m) means driven by said motor for rectilinearly moving said toe contacting member in a direction away from the foot comprising
- (m1) a rectilinearly guided arm rectilinearly moved by said motor and having an engaging connection with the rod carrying said toe contacting member,
- (n) an angularly movable cam having camming engagement with the rod carrying said foot width contacting member,
- (o) a linkage connection between said arm and said cam for angularly moving said cam to retract said foot width contacting member upon retractable movement of said toe contacting member,
- (p) a fixed non-conducting plate having a series of spaced contact bars each connected to energize a different lamp in a length size scale,
- (q) a brush connected with said toe contacting member and movable over said bars to energize a lamp of said length size scale in accordance with the length of the foot,
- (r) a non-conducting plate guided for movement in the direction of movement of said toe contacting member and carrying spaced obliquely disposed contact bars each connected to energize a different lamp in the width size scale,
- (s) a brush connected with said foot width contacting member and movable over the bars on said movable plate, and
- (t) an operative connection between said rod carrying said toe contact member and said movable plate for moving said plate in accordance with movement of said toe contacting member to effect the designation of the proper shoe width for a foot of predetermined length foot.

References Cited by the Examiner

UNITED STATES PATENTS

| | | | |
|---|---|---|---|
| 1,792,892 | 2/31 | Cobb et al. | 33—3.6 |
| 2,096,615 | 10/37 | MacDonald et al. | 33—3.2 |
| 2,251,825 | 8/41 | Fitzpatrick et al. | 33—3.4 X |
| 2,331,177 | 10/43 | De Pesco | 33—3.6 |
| 2,394,149 | 2/46 | Clarke | 33—3.4 |
| 2,650,518 | 9/53 | Zaroff et al. | 33—3.2 X |
| 2,696,051 | 12/54 | Perman et al. | 33—3.6 |
| 2,825,973 | 3/58 | Shaw et al. | 33—172 |

ISAAC LISANN, *Primary Examiner.*